United States Patent
Peacock et al.

[11] Patent Number: 5,255,859
[45] Date of Patent: Oct. 26, 1993

[54] METHOD AND APPARATUS FOR SEPARATING AND CLASSIFYING SCRAP PLASTIC MATERIALS

[75] Inventors: Bobbie D. Peacock; Michael E. Stout, both of Peachtree City; Jeffrey H. Greene, Fayetteville; Jarl B. Lindroos, Peachtree City; Clive E. Hardy, Brooks; James R. Jacobs, Thomaston, all of Ga.

[73] Assignee: M.A. Industries, Inc., Peachtree City, Ga.

[21] Appl. No.: 577,287

[22] Filed: Sep. 4, 1990

[51] Int. Cl.⁵ .............. B03B 7/00; B03B 5/00; B03B 9/06; B08B 3/14
[52] U.S. Cl. ............... 241/79.1; 241/20; 241/21; 241/24; 241/DIG. 38; 241/138; 209/10; 209/17; 209/173; 134/25.1; 134/107; 134/108; 134/110; 134/111; 134/182
[58] Field of Search ............... 241/DIG. 38, 81, 24, 241/21, 20, 46.17, 138, 79.1; 209/3, 17, 12, 10, 172, 173; 134/107, 108, 25.1, 133, 111, 110, 182; 521/40.5, 47

[56] References Cited

U.S. PATENT DOCUMENTS

| | | | |
|---|---|---|---|
| 4,000,031 | 12/1976 | Acobas | 209/173 |
| 4,073,661 | 2/1978 | Buzga | 134/1 |
| 4,096,057 | 6/1978 | Porritt | 209/17 |
| 4,196,019 | 4/1980 | Kohler | 134/111 |
| 4,230,561 | 10/1980 | McMurray | 209/173 |
| 4,379,525 | 4/1983 | Nowicki | 241/24 |
| 4,440,635 | 4/1984 | Reiniger | 209/306 |
| 4,483,768 | 11/1984 | Gazzoni | 209/173 |
| 4,728,045 | 3/1988 | Tomaszek | 241/24 |
| 4,746,422 | 5/1988 | Grimm | 209/17 |
| 4,809,854 | 3/1989 | Tomaszek | 241/24 |
| 4,830,188 | 5/1989 | Hannigan | 241/24 |
| 4,853,115 | 8/1989 | Kennel | 209/173 |
| 4,874,134 | 10/1989 | Wiens | 241/25 |
| 4,944,868 | 7/1990 | Jay | 134/25.1 |
| 5,022,985 | 6/1991 | Nugent | 241/DIG. 38 |
| 5,071,075 | 12/1991 | Wiens | 241/DIG. 38 |

FOREIGN PATENT DOCUMENTS

| | | | |
|---|---|---|---|
| 3002061 | 7/1981 | Fed. Rep. of Germany | 209/173 |
| 2078138 | 1/1982 | United Kingdom | 209/173 |

Primary Examiner—Thomas M. Lithgow
Attorney, Agent, or Firm—Jones & Askew

[57] ABSTRACT

Classifying and processing post-consumer plastic scrap materials for subsequent utilization. Post-consumer plastic scrap of various kinds, such as colored HDPE, natural HDPE, green PET and clear PET are separating into constituent fractions, and each fraction is separately reduced to flakes. At least some of the fractions are separately washed to remove fragments of labels or other foreign matter previously in place on the plastic bottles or other containers making up those scrap constituents.

2 Claims, 4 Drawing Sheets

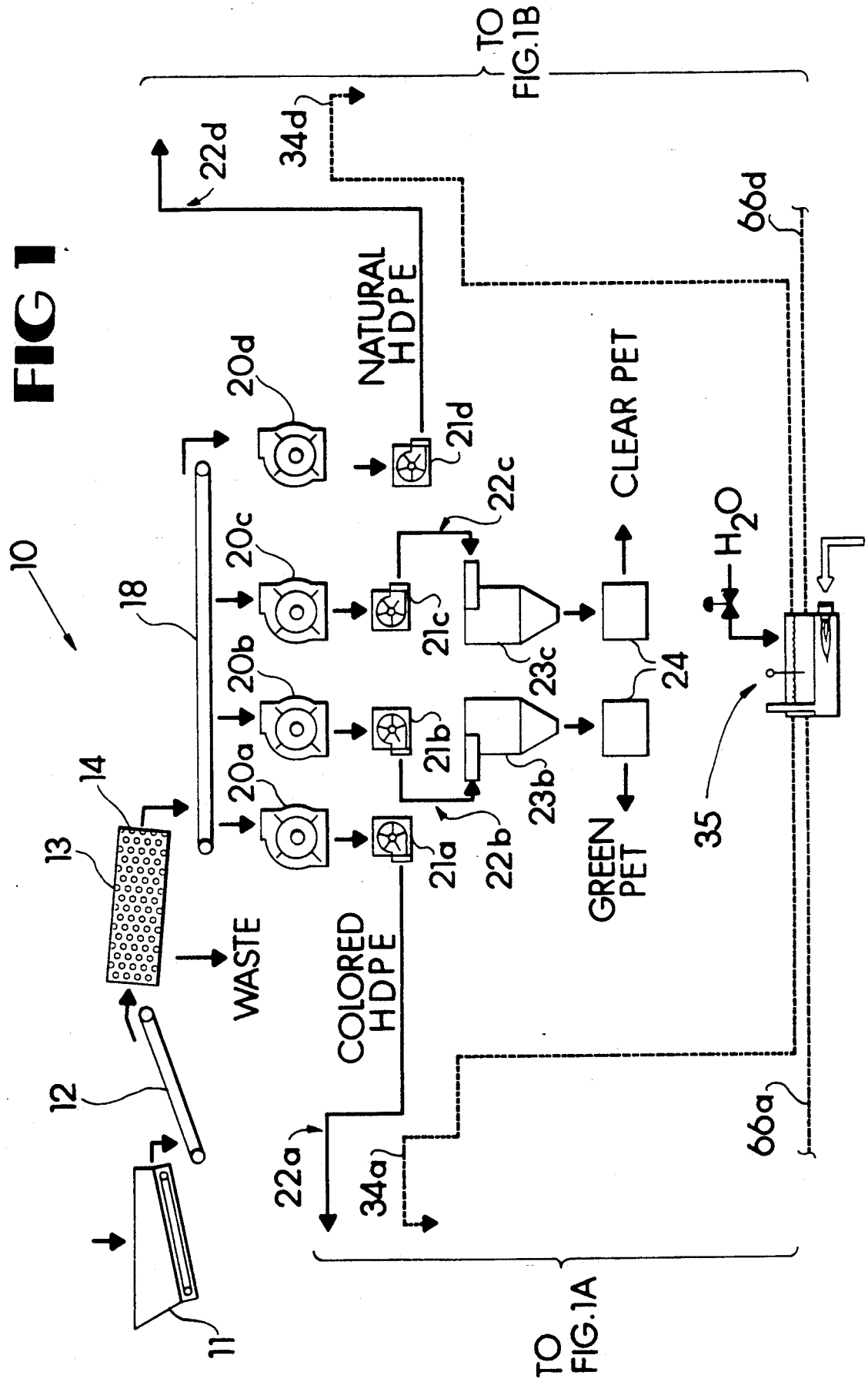

METHOD AND APPARATUS FOR SEPARATING AND CLASSIFYING SCRAP PLASTIC MATERIALS

FIELD OF THE INVENTION

This invention relates in general to recycling post-consumer plastic scrap, and relates in particular to classifying and preparing such scrap for recycling.

BACKGROUND OF THE INVENTION

Plastic materials of many kinds are suitable for recycling to provide raw material for the manufacture of other plastic articles. The wide variety and increasing popularity of plastic containers for various consumer foodstuffs and other products is a bountiful source of plastic suitable for recycling. These products include milk jugs, plastic soft-drink bottles, and tubs or bottles used for packaging condiments and other products. These plastic articles typically are discarded after a single use and are known as post-consumer scrap plastic.

This plastic scrap is segregated from other waste by processors of collected waste and is baled to compress the scrap containers into a relatively dense package suitable for shipment to a recycling facility. This baled consumer scrap usually includes a variety of different kinds of plastic materials, determined by the requirements of appearance and structural strength for the particular containers. For example, plastic milk jugs are made of material having substantial structural strength so that the jugs are not easily ruptured in use and maintain their desired shape when filled with a gallon of liquid. For these reasons, milk jugs are made of high-density polyethylene (HDPE) in a natural state having an opaque white color. Other beverages such as soft drinks are sold in quart or liter plastic bottles which require less structural strength to maintain their shape and to provide stackability, and usually are in bottles of less-costly plastic material such as polyethylene terephthalate (PET). These PET plastic containers may be clear to permit consumer viewing of the contents, or may be colored to protect the contents from exposure to light or for cosmetic appearance. These latter plastic products are known as colored HDPE. Still other food stuffs such as butter, condiments, and the like usually are sold to consumers tubs or other packages of HDPE with a color additive to meet the cosmetic or marketing needs of the merchandiser.

These four kinds of plastics, namely, colored HDPE, green PET, clear PET, and natural HDPE, define the four categories into which most post-consumer scrap plastic fall. Effective recycling of post-consumer plastic requires separating the baled plastic scrap into those four constituents or fractions for most effective recycling, because the color and the organic properties of the fractions determine the best uses of the recycled scrap. Furthermore, some of the containers making up these scrap fractions, especially the containers made of colored HDPE or natural HDPE, have external labels of paper or foam plastic which are considered foreign matter contaminating the scrap for recycling. Removal of this foreign matter from the underlying plastic container thus is required for effective recycling. The containers made of PET usually have the label information printed directly on the container instead of applied as a separate entity onto the container and thus usually do not present the same contaminating problem as HDPE scrap bearing a separate label made of a foreign substance.

SUMMARY OF THE INVENTION

Thus, it is an object of the present invention to provide an improved method and apparatus for recycling scrap plastic products.

It is another object of the present invention to provide an improved method and apparatus for recycling scrap plastic comprising several different constituent materials.

It is still another object of the present invention to provide an improved method and apparatus for classifying scrap plastic products of different materials, at least some of which have foreign matter requiring removal from the plastic.

Stated in somewhat general terms, incoming scrap plastic first is separated into certain classes or fractions of plastic and each fraction is separately reduced to flakes of predetermined size. The flakes obtained from fractions normally having attached foreign matter such as labels are further processed to remove the foreign matter and other contaminants from the flakes. The flakes obtained from fractions not having foreign matter are stored or otherwise made available for subsequent utilization of the flaked scrap product for recycling.

Stated somewhat more specifically, arriving post-consumer plastic scrap first is screened for removal of waste material, and then is classified into two or more fractions according to the nature of the scrap. These fractions are separately ground into flakes. The flakes obtained from scrap material having foreign matter attached are subjected to a washing process by which the fragments of foreign matter become separated from the flakes. The separated foreign matter and other contaminants then are removed from the plastic fragments, and the fragments are at least partially dried for storage or subsequent utilization.

Stated in somewhat greater detail, the plastic fragments containing foreign matter are mixed with water to form a slurry which is recirculated in a digester for a time sufficient to separate the foreign matter from the scrap plastic fragments. The slurry then is caused to overflow the digester in a controlled manner, after which the removed foreign matter is separated from the fragments of plastic and the plastic fragments are dewatered.

The nature of the present invention as well as other objects and advantages thereof will become more apparent from the following description of a preferred embodiment.

BRIEF DESCRIPTION OF THE DRAWINGS

FIGS. 1, 1A, and 1B are components of a schematic diagram showing a preferred embodiment of the present invention in structural and operational detail.

DESCRIPTION OF THE PREFERRED EMBODIMENT

Figure 1A:
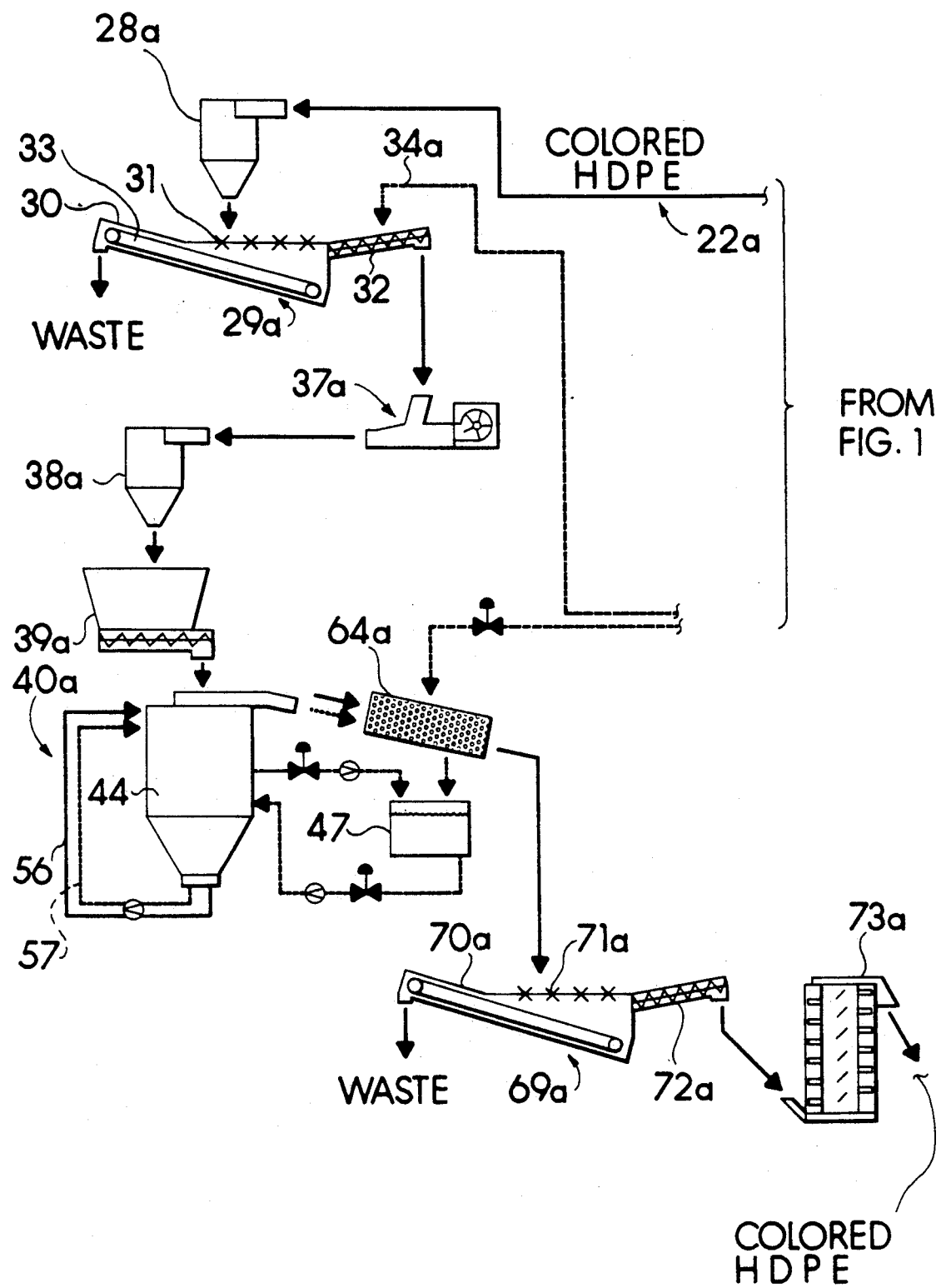

Turning first to FIG. 1, there is shown generally at 10 the material infeed and separation apparatus for the preferred embodiment. This apparatus includes a feed hopper 11 into which baled post-consumer scrap is fed in bulk quantities. For example, heavy machinery such as a front end loader can place one or more bales of scrap at a time into the feed hopper 11. The feed hopper 11 opens the bales of scrap and delivers the scrap material at a consistent rate onto the infeed belt conveyor 12. The infeed conveyor 12 delivers the scrap material to the interior of the rotary trommel 13, which comprises a perforated drum rotating on an axis pitched downwardly from horizontal so that the infeed end of the rotary trommel is higher than the outfeed end 14 thereof. Most of the loose contaminants, such as dirt and bottle lids, occurring in the baled plastic scrap are removed by falling through the openings in the rotary trommel 13, but those openings are too small to allow any significant amount of the plastic scrap materials to pass through.

The outfeed end 14 of the rotary trommel 13 is positioned to discharge the plastic scrap material onto the horizontal belt conveyor 18. A number of human workers (not shown) stand alongside the belt conveyor 18 and hand-pick scrap plastic material that falls into the following four categories: colored HDPE, green PET, clear PET, and natural HDPE. These materials make up the four fractions of post-consumer scrap material processed by the present embodiment, although it should become apparent that the process and apparatus of the present invention are not limited to those particular fractions.

Each handpicked fraction of the scrap is dropped into the infeed of a corresponding one of the grinders 20a . . . 20d. Each grinder reduces the scrap infeed to flakes of approximately a predetermined size, for example, one-half inch in diameter. The grinder 20a receives colored HDPE and discharges that material in flake form to the air blower 21a forming part of an air conveying system indicated generally at 22a in FIGS. 1 and 1A. The grinders 20b and 20c, respectively, deliver green PET and clear PET in flake form to the air blowers 21b and 21c forming part of the air conveying systems 22b and 22c. Lastly, the grinder 20d delivers natural HDPE in flake form to the air blower 21d forming part of the air conveying system 22d, shown in FIGS. 1 and 1B. The air conveying systems 22a . . . 22d are constructed and operate in a manner known to those skilled in the art to deliver the flaked plastic fractions to their respective destinations as described below.

The disclosed embodiment of the invention receives scrap plastic in which both the green PET and the clear PET fractions have no label or other foreign matter attached to the plastic product. Accordingly, the flakes of green PET and clear PET from the grinders 20b and 20c are usable for recycling without further processing, and the air conveying systems 22b and 22c convey those fractions to the surge hoppers 23b and 23c. Quantities of those PET flakes are withdrawn from the surge hoppers 23b and 23c from time to time, for example, to fill the boxes 24 for transport to storage or further processing.

Figure 1B:
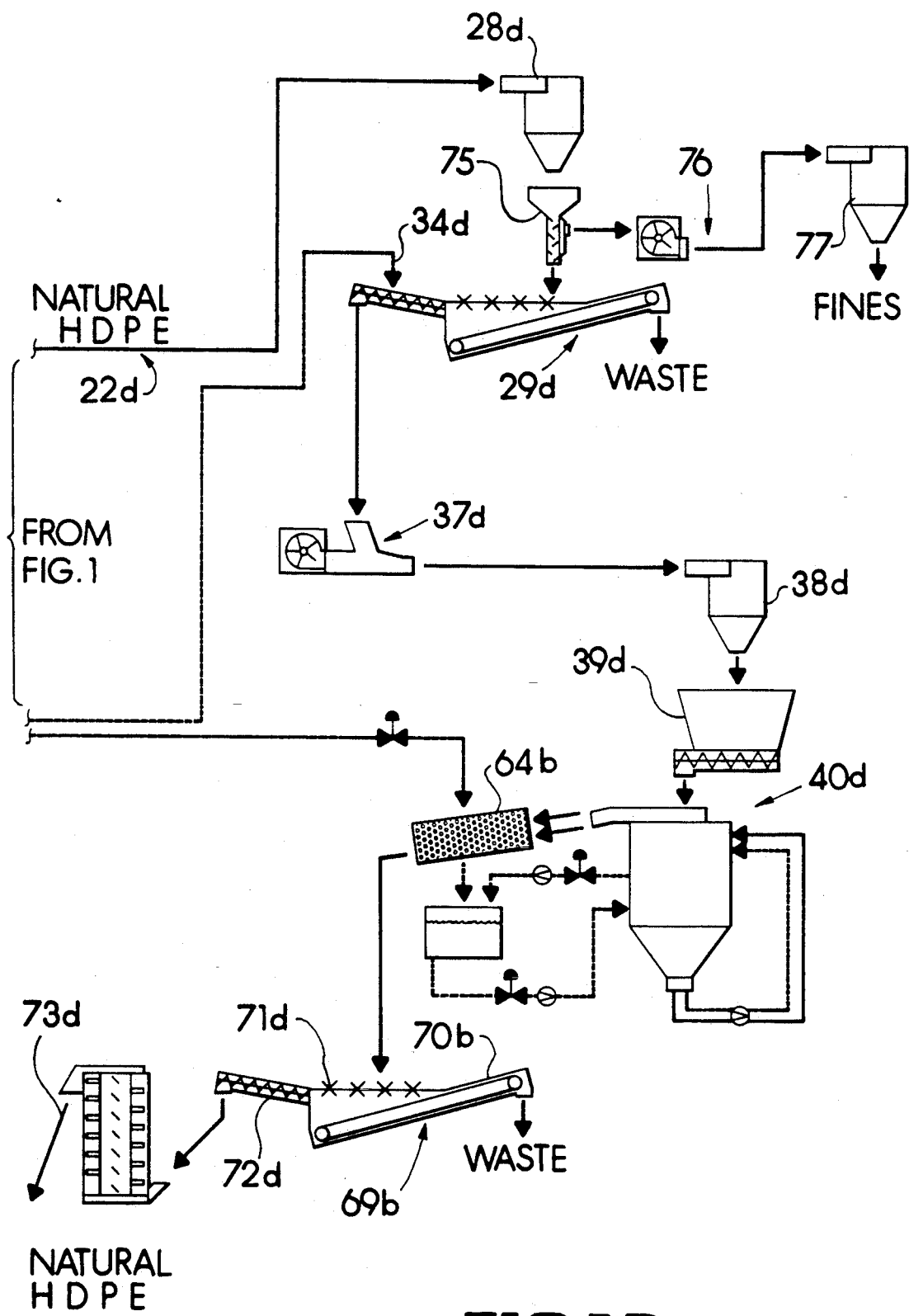

FIG. 1A shows the apparatus for cleaning and removing foreign matter from the colored HDPE fragments, with FIG. 1B showing the corresponding apparatus for the natural HDPE fragments. The apparatus shown in FIG. 1B is substantially identical in structure and function to that of FIG. 1A, and the following discussion deals primarily with the apparatus of FIG. 1A. However, it should be understood that the various elements shown in FIG. 1A with an "a" suffix for processing the flakes of colored HDPE find structural and functional correspondence in the elements identified with a "d" suffix and shown in FIG. 1B for processing the flakes of natural HDPE.

The air conveying system 22a delivers flakes of colored HDPE to the surge hopper 28a locating above the first float-sink classifier 29a. This float-sink classifier 29a comprises a trough 30 having an inclined bottom and containing a quantity of water into which the colored HDPE flakes from the surge hopper 28a are deposited in an orderly manner. Paddle wheels 31 are mounted across the trough at the surface of the water, and these paddle wheels are driven in a direction to propel floating objects toward the screw conveyor 32 located at the deep end of the trough 30.

As the flakes of colored HDPE enter the water in the trough 30, the flakes are washed by the agitating action of the several paddle wheels 31 on the surface of the water. The flakes of colored HDPE float on the surface of the water and, as mentioned previously, the paddle wheels 31 agitate the flakes while slowly conveying the flakes toward the screw conveyor 32. The relatively heavy contaminants that become separated from the HDPE flakes sink to the bottom of the trough 30 and are removed from the trough by the drag conveyor 33 at the bottom of the trough.

The floating colored HDPE flakes removed from the first float-sink classifier 29a by the screw conveyor 32 are delivered to the rotary depulper 36a which substantially dewaters the flakes by spin-drying them. The dewatered flakes enter the second air conveying system 37a, which in turn delivers the flakes to the second surge hopper 38a. The surge hopper 38a feeds a batch conveyor 39a which delivers a predetermined amount of the colored HDPE flakes to the digester 40a on a timed cycle. Details of the digester 40a are shown in FIG. 2.

The digester 40a washes and thoroughly agitates the colored HDPE flakes in hot water containing a detergent or other additives to remove fragments of labels or other foreign matter from the flakes. The digester 40a comprises an outer tank 44 having an open top 45 for receiving the flakes of colored HDPE from the batch conveyor 39, FIG. 1A. An internal screen 46 fits within the outer tank 44 and defines the volume within the outer tank for containing the flake material. Both the outer tank 44 and the internal screen are cylindrical in shape, with the screen having openings which retain the flakes within the screen. Preheated water is supplied to the tank 44 from the circulation tank 47 by way of the water supply pump 48, and the level control pump 49 withdraws dirty water from the digester outer tank 44 to the circulation tank 47.

Figure 2:
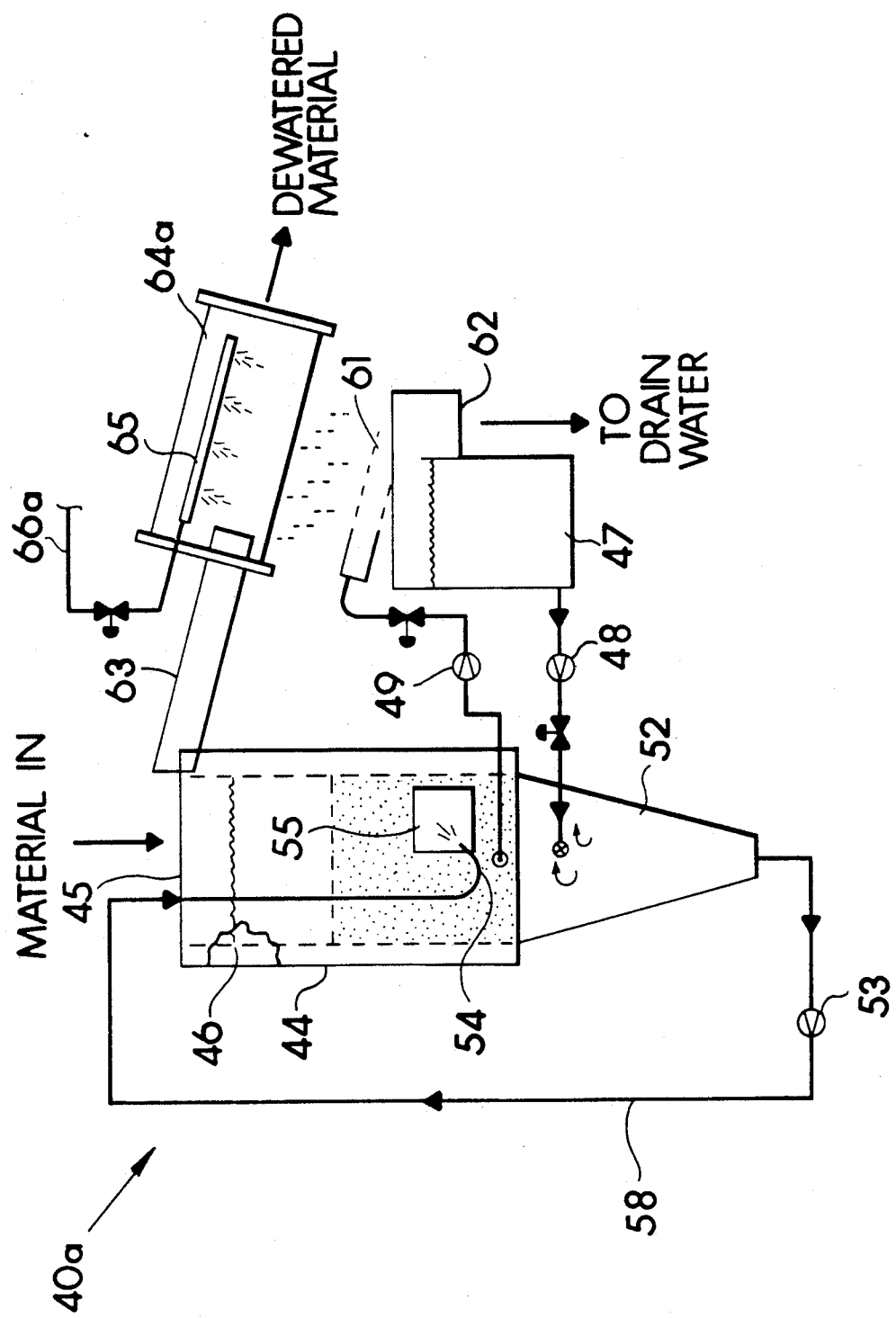
FIG. 2 is a schematic view showing one of the digesters used in the preferred embodiment.

The digester 40a, as best seen in FIG. 2, has a conical bottom 52 with its wide upper end in communication with the open bottom of the internal screen 46. The narrow lower end of the bottom 52 is connected to the inlet of the recirculating material pump 53 which returns the slurry of water and HDPE flakes back into the digester through the outlet of the pipe 54, located within the internal screen 46 well below the surface of the water-HDPE flake slurry within the digester 40a. A baffle 55 located at the outlet of the pipe 54 helps disperse the pumped slurry from that outlet, thereby creating a turbulent flow which agitates and mixes the HDPE flakes within the slurry. The recirculation of the liquid-flake slurry through the digester 40a by means of the recirculating material pump 53 is functionally illustrated in FIG. 1A by the solid line 56 connoting recirculation of the flake material, and by the broken line 57 connoting recirculation of water, although it should now be apparent that this recirculation takes place within the single pipe 58 shown in FIG. 2.

The digester 40a operates in the following manner. At the start of each cleaning cycle, the outer tank 44 is filled with preheated water from the circulation tank 47, up to a level which allows sufficient headroom to receive a predetermined charge of HDPE flakes from the batch conveyor 39, FIG. 1A. Once the volume within the internal screen 46 receives a change of HDPE flakes, the recirculating material 53 pump operates to recirculate the water-flake slurry through the digester, thereby creating an agitating action which combines with the hot water and additives in the water to remove label fragments and other foreign materials from the HDPE flakes. The pump 49 operates at this time to withdraw water from the outer tank 44 to the circulation tank 47, and the withdrawn water enters the screen 61 which shunts contaminants to the overflow drain 62 at one side of the circulation tank. The pump 48 returns cleaned hot water to the outer tank 44 to maintain the proper slurry level within the screen 46. The slurry level at this time is maintained below the upper end of the overflow chute 63 located at the upper end of the internal screen 46.

After the HDPE flakes have been in the digester 40a for a predetermined time, the level control pump 49 is shut off while the water supply pump 48 continues to operate. This net inflow of liquid to the outer tank 44 causes the slurry level to rise within the screen 46 until the slurry level reaches the upper end of the overflow chute 63. The slurry then overflows the screen 46 and flows down the chute 63 to enter the rotary dewatering screen 64. A spray wash 65 within the dewatering screen 64 receives preheated water along the line 66a from the water heater 35, FIG. 1, to rinse any foreign matter clinging to the wet flakes of colored HDPE within the dewatering screen. The water runoff from the spray wash 65 enters the circulation tank 47 along with the water from the slurry and provides make-up water for the digester.

The dewatered flakes pass from the dewatering screen 64a to the second float-sink classifier 69a, FIG. 1A, where the flakes again are washed. The second float-sink classifier 69a is similar in construction and operation to the first such classifier 29a, and any remaining contaminants sink to the bottom of the trough 70a for removal as waste while the paddle wheels 71a agitate and move the flakes along the water surface to the screw conveyor 72a.

The screw conveyor 72a discharges the colored HDPE flakes into a spin drier 73a which removes most of the moisture from the flakes. The flakes are discharged from the spin drier 73a into boxes for transport to storage or further processing.

The natural HDPE flakes are processed with the steps illustrated in FIG. 1B in substantially the same manner as the colored HDPE flakes shown and described with regard to FIG. 1A.

If the HDPE flake material from the grinders 20a and 20d contains a large amount of relatively fine contaminants, those contaminants can overload the first float-sink classifiers 29a and 29d. To prevent that problem from occurring, a cyclone separator 75 (FIG. 1B) is shown installed immediately below the surge hopper 28d. The fines removed by the cyclone separator 75 are carried by the air conveyor 76 to a hopper 77 for storage and subsequent disposal. It will be apparent that a similar cyclone separator and related apparatus can be provided to receive the output of the surge hopper 28a shown in FIG. 1A.

The flaked green PET and clear PET are not treated by a digester or otherwise cleaned in the present embodiment. However, it should be understood that either or both fractions of PET can be subjected to such cleaning processes if required by the nature of the scrap plastic material undergoing classification in accordance with the present invention.

It should now be apparent that the foregoing relates only to a preferred embodiment of the present invention, and that numerous changes and modifications therein may be made without departing from the spirit and scope of the invention as defined in the following claims.

What is claimed is:

1. Apparatus for processing post-consumer scrap plastic materials comprising presorted constituent fractions containing at least some of colored HDPE, green PET, clear PET, and natural PET, some of which fractions have foreign matter adhered thereto, comprising in combination:

means receiving the fractions and separately reducing each fraction to fragments not exceeding a certain size;

means separately receiving the fragments making up each fraction known to contain foreign matter and operative to form a liquid slurry of the fragments;

means for receiving and agitating each slurry so that the foreign matter becomes detached from the fragments of scrap plastic contained in the slurry;

means for receiving and dewatering each agitated slurry to remove the fragments of the fractions from the separated foreign matter;

means for receiving and washing the separated fragments of each such fraction to remove contaminants; and means for receiving and at least partially drying the plastic fragments of each previously-washed fraction;

the means to form a liquid slurry comprising an outer tank open at an upper end;

screen means located within the outer tank and having an open upper end to receive the fragments of the plastic, said screen means having a screen and defining a chamber which communicates with said outer tank only through said screen, so that the fragments are contained within the screen;

means for circulating a liquid through the outer tank;

the screen having openings sized to allow the liquid to enter and mix with the fragments within the screen to form a slurry but to prevent the fragments from migrating from the screen into the outer tank;

means defining a slurry outlet at an upper portion of the screen;

means for selectively adding liquid to the outer tank; and means for selectively withdrawing liquid from the outer tank so as to maintain the slurry at a predetermined level within the screen and below the slurry outlet, whereby the slurry level rises within the screen to overflow through the slurry outlet in a controlled manner when the means for withdrawing liquid is inoperative.

2. Apparatus for processing post-consumer scrap plastic materials comprising presorted constituent fractions of at least some of colored HDPE, green PET, clear PET, and natural PET, at least one constituent fraction having foreign matter adhered thereto, comprising in combination;

means for separately receiving each of the presorted fractions and separately reducing each fraction to fragments not exceeding a certain size;

means separately receiving the fragments making up said at least one constituent fraction known to contain foreign matter and operative to form a liquid slurry of the fragments;

the means to form a liquid slurry comprising an outer tank open at an upper end;

screen means located within the outer tank and having an open upper end to receive the fragments of the plastic;

said screen means having a screen and defining a chamber which communicates with said outer tank only through said screen, so that the fragments are contained within the screen;

means for circulating a liquid through the outer tank; and the screen has openings sized to allow the liquid to enter and mix with the fragments within the screen to form a slurry, but being sufficiently small to block the fragments from migrating from the screen into the outer tank;

means for receiving and agitating each slurry so that the foreign matter becomes detached from the fragments of scrap plastic contained in the slurry;

means for selectively adding liquid medium to the slurry receiving means so that the slurry overflows the slurry receiving means in a controlled manner;

means for receiving and dewatering the overflow of each agitated slurry to remove the fragments of the fractions from the separated foreign matter;

means for receiving and washing the separated fragments of each such fraction to remove contaminants; and means for receiving and at least partially drying the plastic fragments of each previously-washed fraction.

* * * * *